No. 672,799. Patented Apr. 23, 1901.
W. McMEANS.
HAY ELEVATOR.
(Application filed July 30, 1900.)
(No Model.) 2 Sheets—Sheet 1.
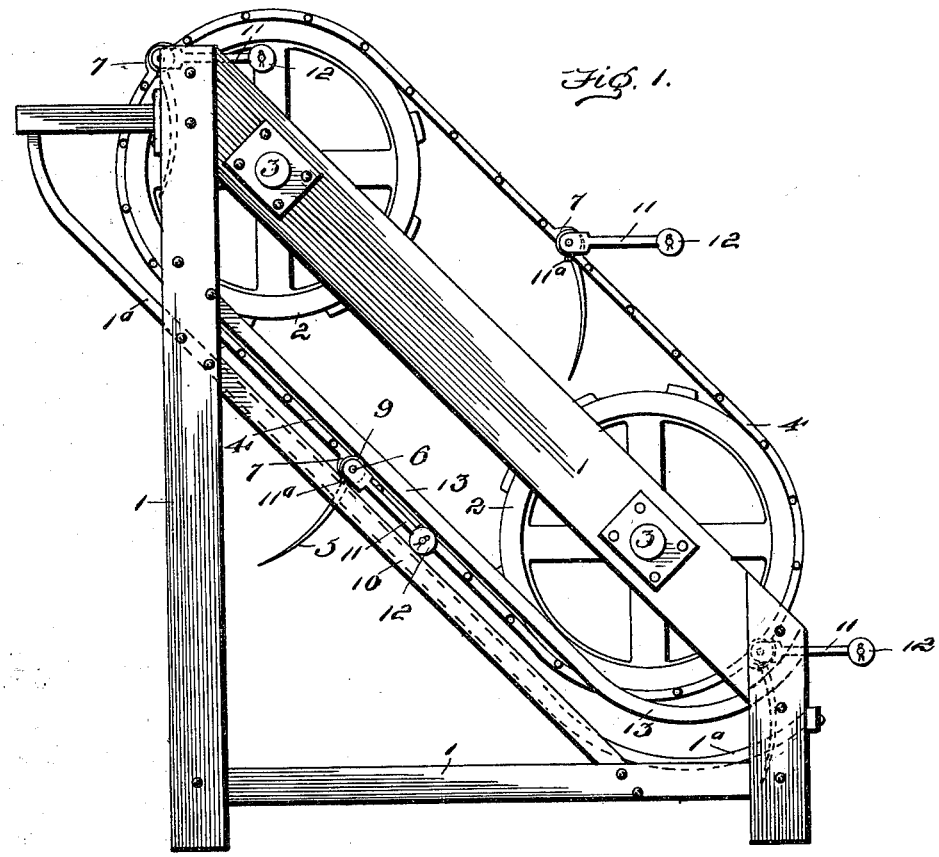
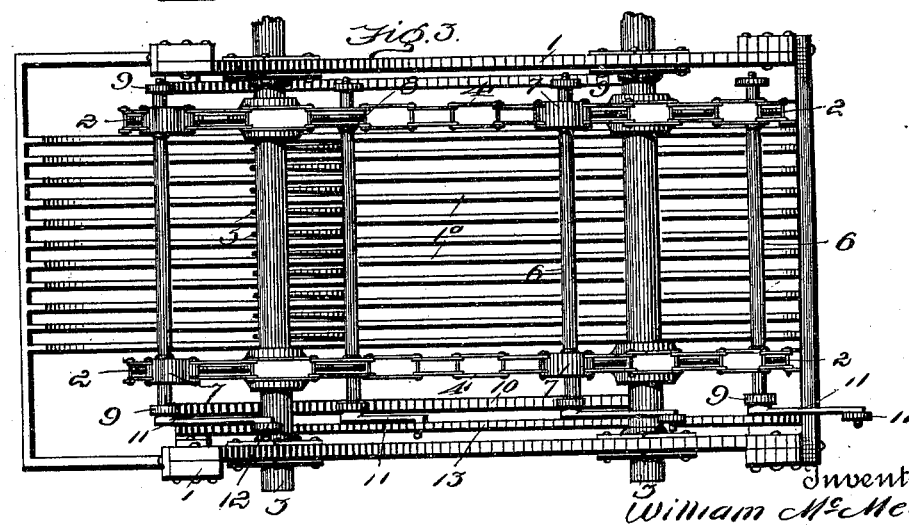
Witnesses
Edwin B. H. Tower, Jr.
W. Perry Hahn
Inventor
William McMeans
By: Edson Bro's
Attorneys No. 672,799. Patented Apr. 23, 1901.
W. McMEANS.
HAY ELEVATOR.
(Application filed July 30, 1900.)
(No Model.) 2 Sheets—Sheet 2.

Witnesses
Inventor
William McMeans
By:
Edson Bro's.
Attorneys

UNITED STATES PATENT OFFICE.

WILLIAM McMEANS, OF ODELL, ILLINOIS.

HAY-ELEVATOR.

SPECIFICATION forming part of Letters Patent No. 672,799, dated April 23, 1901.

Application filed July 30, 1900. Serial No. 25,341. (No model.)

*To all whom it may concern:*

Be it known that I, WILLIAM MCMEANS, a citizen of the United States, residing at Odell, in the county of Livingston and State of Illinois, have invented certain new and useful Improvements in Hay-Elevators; and I do hereby declare the following to be a full, clear, and exact description of the invention, such as will enable others skilled in the art to which it appertains to make and use the same.

My invention relates to improvements more particularly in hay elevators or carriers, although adapted for other purposes.

It has for its object to cause the forks or carriers proper to maintain an effective position at all times, beginning with their initial engagement with the hay or other material acted upon, including their disengagement therefrom or delivery of said material, said forks or carriers therefore engaging the hay or other article it is desired to elevate with the minimum friction or resistance and presenting the maximum area or surface thereto, and to provide for the effective retention of the forks or carriers in their operative or working position.

To these ends my invention consists of the combination of certain parts, including their construction and arrangement, substantially as hereinafter more fully disclosed, and specifically pointed out by the claims.

Figure 2:
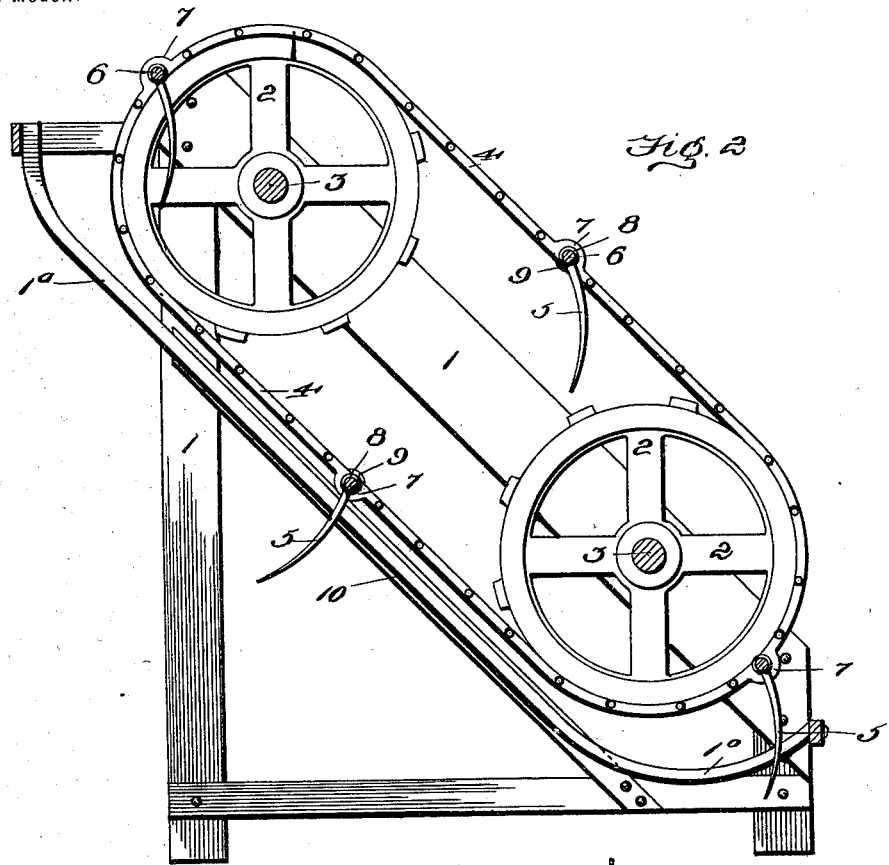
Figure 4:
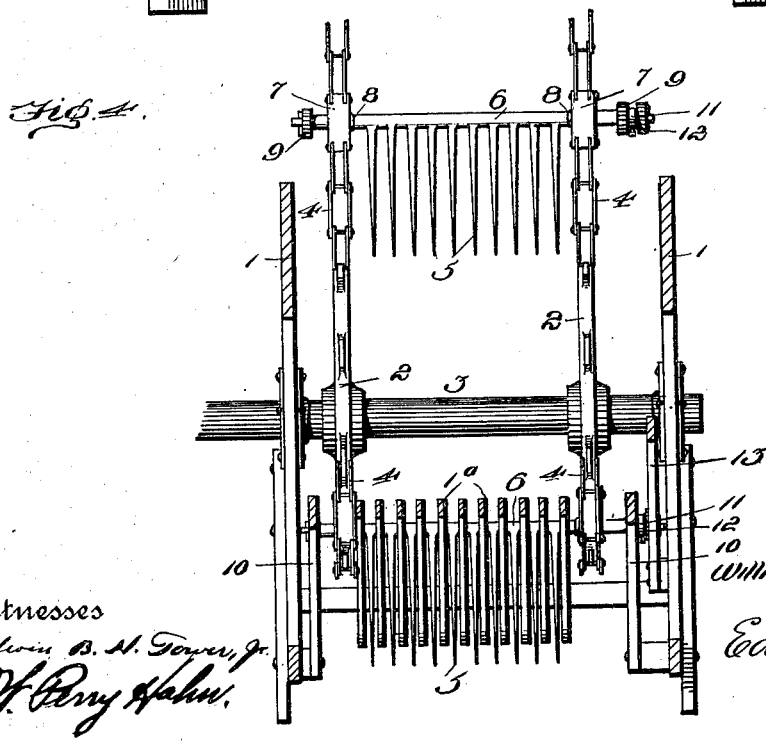

In the accompanying drawings, illustrating the preferred embodiment of my invention, Figure 1 is a side elevation. Fig. 2 is a longitudinal section. Fig. 3 is a plan view. Fig. 4 is a transverse section.

Latitude is allowed herein as to details, as they may be changed or varied as occasion may require without departing from the spirit of my invention and the same yet remain intact and be protected.

In carrying out my invention I mount or support at a suitable inclination in a frame 1, properly spaced or disposed apart, what may be termed "sprocket" or "rag" wheels 2 2, with their shafts or axes 3 suitably journaled in the upper inclined side bars of said frame. Said frame has secured between its bottom side bars and longer uprights, in any suitable manner, supplemental bars 1$^a$, with their upper end portions projecting beyond said frame to release or remove the hay or material from the forks or carriers after having been elevated to the required point—as, for instance, in loading hay upon a wagon—as will be readily understood. These wheels are encompassed by endless chain belts 4, with their links adapted to receive or engage the teeth or cogs of said wheels and carrying forks or carriers 5, preferably integral or in one with transverse rods or bars 6 and feathering or tapering toward the free or outer ends of their tines, thus providing for their advantageous entrance to the hay or other material and with reduced resistance or friction. The rods or bars 6 are extended laterally or endwise to provide for their attachment to said chain belts, preferably by passing said rods or bars through and enabling them to turn or pivot and the forks or carriers to maintain an effective position at all times in eye or apertured castings 7, sandwiched between or interconnected with the links of said chain belts at suitable intervals apart. Said rods or bars are preferably cast or formed, close up to the lateral edges of the forks or carriers 5, with collars or shoulders 8, adapted to oppose the inner edges of the eye-castings 7 to prevent endwise or lateral displacement of the rods, consequently preventing or guarding against like movement or displacement of the forks or carriers. The rods or bars 6 are also provided at their outer ends with freely-turning rolls or bearings 9 to reduce frictional contact where they travel or bear upon a way or track 10, suitably secured or bracketed to the inner sides of the frame 1 for that purpose. The rods or bars 6 are also provided each at one end with a crank or arm 11, normally at an angle to the plane of the forks or carriers, with a freely-turning roll or bearing 12 thereon, adapted to travel during the descent of the forks or carriers and their insertion into the hay or other material in contact with a guide or guard 13, suitably secured or bracketed to the frame. The angle of said arms may be varied as occasion may require by the use of set-screws 11$^a$, adapted to hold said arms to said rods or bars, as readily seen.

The guide or guard 13 is suitably curved at its normally forward end upward above the point of penetration to effect the retention of the forks or carriers in an effective or operative position as against the action or resistance of the hay or material as said forks enter the same and during initial penetration or insertion. The guide or guard 13 is extended below its curved forward end portion horizontally a suitable distance rearward to retain or hold the arms or cranks down, in turn holding the forks or carriers in their operative or effective position to provide against the resistance or pressure of the hay or other material being elevated. If desired, the guide or guard 13 may also be curved at its rear end.

It will be understood that the rear uprights of the frame 1 may be equipped with rolls or trucks, (not shown,) to one of which or axles thereof may be secured a sprocket-wheel (not shown) suitably belted or geared to one of said shafts 3 for actuating the belt of forks, the forward end of the machine in practice being suitably connected or coupled to, say, a wagon, (not shown,) the hay being raked up in windrows, for instance, upon the field and engaged and elevated by the forks of said elevator and delivered into the wagon, thus disclosing one use of my invention.

Having thus fully described my invention, what I claim, and desire to secure by Letters Patent, is—

1. In a device of the character described, the combination of driving-wheels, suitably supported tracks and guard or guide, endless belts compassing said wheels, pivoting-rods carrying forks and, themselves, carried by said belts and having rolls and crank-arms provided with rolls, said rolls traveling upon said tracks and guide, or guard, respectively, and inclined bars arranged parallel, the greater portions of their lengths, with the line of travel of said belts and distantly from said rolls and belts, the upper end portions of said bars being concaved toward, and yet gradually diverging from, said line of travel, substantially as set forth.

2. In a device of the character described, the combination of endless belts pivotally-suspended forks or carriers, wheels encompassed by said belts, a way or track and a guide or guard, the fork or carrier suspending or pivoting rods or bars adapted to travel upon said track or way and having adjustable cranks or arms adapted to engage said guide or guard, substantially as set forth.

In testimony whereof I affix my signature in presence of two witnesses.

WILLIAM McMEANS.

Witnesses:
A. MURRAY,
FRANK MOORE.